US011156192B2

(12) United States Patent
Clark et al.

(10) Patent No.: US 11,156,192 B2
(45) Date of Patent: Oct. 26, 2021

(54) AIR INTAKE SCREEN DEBRIS SENSING (71) Applicant: Deere and Company, Moline, IL (US)

(72) Inventors: Scott N. Clark, Bettendorf, IA (US);
Nikolas J. Jacobs, Rock Island, IL (US)

(73) Assignee: Deere & Company, Moline, IL (US)

(*) Notice: Subject to any disclaimer, the term of this patent is extended or adjusted under 35 U.S.C. 154(b) by 209 days.

(21) Appl. No.: 16/375,803

(22) Filed: Apr. 4, 2019

(65) Prior Publication Data
US 2020/0318584 A1 Oct. 8, 2020

(51) Int. Cl.
*B01D 50/00* (2006.01)
*F02M 35/024* (2006.01)
*B01D 46/00* (2006.01)
*F24F 11/39* (2018.01)
*B01D 46/44* (2006.01)
*B01D 46/10* (2006.01)
*F01P 11/12* (2006.01)
*F24F 11/30* (2018.01)

(52) U.S. Cl.
CPC ....... *F02M 35/024* (2013.01); *B01D 46/0086* (2013.01); *B01D 46/0067* (2013.01); *B01D 46/0071* (2013.01); *B01D 46/10* (2013.01); *B01D 46/446* (2013.01); *B01D 2273/26* (2013.01); *B01D 2279/60* (2013.01); *F01P 11/12* (2013.01); *F24F 11/30* (2018.01); *F24F 11/39* (2018.01)

(58) Field of Classification Search
CPC ............. F02M 35/024; B01D 46/0086; B01D 2279/60; B01D 46/10; B01D 46/0067; B01D 46/0071; B01D 46/446; B01D 2273/26; F24F 11/39; F24F 11/30; F01P 11/12
See application file for complete search history.

(56) References Cited

U.S. PATENT DOCUMENTS

| | | | | |
|---|---|---|---|---|
| 4,616,777 A | * | 10/1986 | Fisher | F24F 3/14 236/44 C |
| 5,141,309 A | * | 8/1992 | Worwag | F24F 8/10 356/72 |
| 5,348,568 A | * | 9/1994 | Oda | B01D 46/002 55/283 |
| 6,066,194 A | * | 5/2000 | Hugghins | B03C 3/36 96/397 |
| 6,228,155 B1 | * | 5/2001 | Tai | B01D 46/0086 55/DIG. 34 |

(Continued)

FOREIGN PATENT DOCUMENTS

DE 10245911 4/2004

*Primary Examiner* — Dung H Bui
(74) *Attorney, Agent, or Firm* — Rathe Lindenbaum LLP (57) ABSTRACT An air intake screen debris cleaning system may include an intake screen through which air is drawn in a first direction for cooling, a reverse airflow generation system to create a reverse airflow in a second direction opposite the first direction to clear debris from the intake screen, a sensor to sense debris that is collected on the intake screen and a controller to activate the reverse airflow generation system based upon signals from the sensor. In one implementation, the sensor comprises an emitter to emit a sensor beam that extends along a face of the air intake screen and which does not intersect or pass through the air intake screen prior to being sensed.

20 Claims, 7 Drawing Sheets (56) References Cited

U.S. PATENT DOCUMENTS

| | | | | |
|---|---|---|---|---|
| 6,494,940 B1* | 12/2002 | Hak | ............... | A61L 9/16 55/471 |
| 6,558,444 B1* | 5/2003 | Hunter | ............... | B01D 46/003 55/385.1 |
| 7,012,685 B1 | 3/2006 | Wilson | | |
| 8,029,608 B1* | 10/2011 | Breslin | ............... | B01D 46/0086 96/421 |
| 10,639,577 B1* | 5/2020 | Wilson, Jr. | ............... | F24F 11/39 |
| 2007/0013534 A1* | 1/2007 | DiMaggio | ............... | G08B 5/36 340/607 |
| 2007/0199378 A1* | 8/2007 | Daoud | ............... | G01N 15/08 73/579 |
| 2009/0165644 A1* | 7/2009 | Campbell | ............... | B01D 46/444 95/25 |
| 2010/0048123 A1* | 2/2010 | O'Gorman | ............... | F24F 11/0001 454/212 |
| 2010/0313748 A1* | 12/2010 | Schluter | ............... | B01D 46/46 95/25 |
| 2012/0234169 A1* | 9/2012 | Painter | ............... | B01D 46/0086 95/278 |
| 2013/0289919 A1* | 10/2013 | Wilson, Jr. | ............... | G01N 21/59 702/104 |
| 2014/0251129 A1* | 9/2014 | Upadhyay | ............... | B01D 46/12 95/19 |
| 2015/0027311 A1* | 1/2015 | Link | ............... | F02M 35/10255 95/279 |
| 2015/0254958 A1* | 9/2015 | Sherman | ............... | F24F 11/30 340/607 |
| 2016/0121251 A1* | 5/2016 | Baek | ............... | F24F 8/10 95/25 |
| 2017/0001137 A1* | 1/2017 | Lans | ............... | B01D 46/008 |
| 2017/0051937 A1* | 2/2017 | Toyoshima | ............... | F24F 11/62 |
| 2017/0291131 A1* | 10/2017 | Sergeyev | ............... | B01D 46/0083 |
| 2018/0221795 A1* | 8/2018 | Bonifas | ............... | B01D 35/143 |
| 2018/0328320 A1* | 11/2018 | Lecuelle | ............... | B60K 13/02 |
| 2019/0107296 A1* | 4/2019 | Clark | ............... | F24F 11/56 |

* cited by examiner

AIR INTAKE SCREEN DEBRIS SENSING

BACKGROUND

Working machines frequently operate in an environment having airborne particles and debris. Such working machines include a power unit in the form of an internal combustion engine or an electric motor that drives working components or members of the machine. Such working machines are frequently cooled with air drawn through an air intake screen.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION OF EXAMPLES

Disclosed herein are example air intake screen debris monitoring and cleaning systems, air intake systems and air intake screen debris monitoring and cleaning methods. The example air intake screen debris monitoring and cleaning systems, air intake systems and air intake screen debris monitoring and cleaning methods facilitate the sensing or detection of debris on air intake screen which may further facilitate automatic and efficient cleaning of the air intake screen by reverse airflow generation to enhance cooling of components of the working machine. Because the cleaning of the air intake screen by reverse airflow generation may be restricted to times when the screen is sufficiently dirty, reverse airflow generation is not unnecessarily performed at times when cooling may be beneficial to prevent overheating, such as during hot ambient operating conditions. As a result, the example systems and methods may prolong the useful life of the working machine component being cooled and may conserve energy.

In some implementations, the examples comprise a sensor that senses debris that is collected on the intake screen, were in a controller activates a reverse airflow generation system based upon signals from the sensor. The reverse airflow is directed in a second direction opposite to the direction which air is drawn through the screen for cooling. The reverse airflow cleans debris from the air intake screen.

In some implementations, the systems and methods detect the presence of debris on the air intake screen with a sensor that utilizes an emitter and a detector, wherein the emitter emits a sensor beam that is directed along a face of the air intake screen without intersecting the air intake screen prior to being sensed. Debris accumulating on the face of their intake screen blocks or interrupts the sensor beam, facilitating the detection of debris accumulation. Because the sensor beam is directed across a face of the air intake screen, without intersecting the air intake screen, the sensor beam may detect debris accumulation across a larger surface area of the face of the air intake screen by sensing buildups of debris, rather than just occlusion of the individual vent openings or perforations.

In some implementations, the systems and methods detect the presence of debris on the air intake screen with a sensor that utilizes an emitter and a detector, or in the emitter emits the sensor beam that is directed along and within a channel that extends along a face of the air intake screen. In such an implementation, the sensor beam extends parallel to or at least along the channel without intersecting the floor sides of the channel, without intersecting the air intake screen itself, prior to being sensed. In one implementation, the sensor beam is directed to a spaced detector which is situated at a different location along the channel. In another implementation, the sensor beam is directed to a spaced reflector this is situated at a different location along the channel, were in the reflector reflects the sensor beam back towards a detector, such as a detector located alongside of the emitter or a detector that is integrated with the emitter.

In some implementations, at least one of the emitter, detector and/or reflector (where provided) may be directly supported on and mounted to the air intake screen. In other implementations, the emitter, detector and/or reflector may each be supported in a frame or other support that supports the air intake screen or that surrounds the air intake screen, adjacent the front air intake side or face of the air intake screen. In yet other implementations, at least one of the emitter, detector and/or reflector (where provided) may be directly supported and mounted to or carried by the air intake screen while the others of the emitter/detector and/or reflector may be directly supported on in supported by a frame or other support that supports the air intake screen for that surrounds the air intake screen, adjacent the front air intake side face of the air intake screen.

In one implementation, the sensors in the form of emitter-detector (and the reflector in some cases) may be provided in every channel or groove of the air intake face of the air intake screen. In other implementations, the sensors may be distributed at selected locations in selected channels along the air intake face of the air intake screen. In some implementations, the sensors may be provided in just those portions of the air intake face that have historically experienced greater debris accumulation or that have a greater impact upon the cooling function.

In some implementations, debris accumulation on the air intake face of the air intake screen may be sensed with a sensor in the form of a pressure sensor. For example, in one implementation, a pressure sensor may be provided to sense a pressure within a manifold or shroud adjacent a fan or blower, wherein pressure changes may indicate the accumulation of debris on the air intake screen. In such an implementation, the sensing of debris accumulation may trigger activation of a reverse airflow generation system.

In one implementation, the reverse airflow generation system may comprise a variable pitch fan, wherein the angle of the fan blades are adjusted between a first cooling state in which air is drawn through the air intake side of the air intake screen and a second cleaning state in which air is blown through the air intake screen and away from the air intake screen. In other implementations, the reverse airflow generation system may comprise other mechanisms for creating a reverse direction airflow through the air intake screen. For example, in other implementations, the reverse airflow generation system may comprise additional fans that direct airflow in the reverse direction (the direction opposite to the direction which air moves when performing the cooling function), wherein such additional fans are in an inactive state during cooling. In yet other implementations, the reverse airflow generation system may comprise movable or adjustable airflow directing baffles that selectively redirect airflow to change its direction.

For purposes of this disclosure, the term "reverse direction", "opposite direction" or "reverse airflow" when referring to the direction of the airflow produced by the reverse airflow generation system shall mean any direction that passes through the air intake screen from a first or output face of the screen to an opposite second or input face of the screen, wherein the intake direction is a direction which hair passes through the air intake screen from the second or input face of the screen to the first or output face of the screen. The "reverse direction" or "opposite direction" is not limited to a direction exactly 180° from the intake direction of airflow during cooling operations. The "reverse direction" or "opposite direction" is not limited to a direction perpendicular to the intake face of the screen, but may have any angle relative to the intake face of the screen.

In one implementation, the activation of the reverse airflow generation system is based on the sensed degree of debris accumulation on the air intake screen. In another implementation, the activating of the reverse airflow generation system is based upon the sensed degree of debris accumulation on the air intake screen in combination with a sensed temperature of equipment being cooled by the air passing through the air intake screen. For example, the reverse airflow generation system may remain inactive during those times when the temperature of the equipment being cooled is high, such as when the operating machine is working in high ambient temperatures, despite a given degree of detected debris accumulation, whereas the reverse airflow generation some may be activated in response to the same given degree of detected debris accumulation when the temperature or equipment being cooled is at a lower temperature.

Disclosed herein is an example intake screen debris cleaning system that comprises an intake screen through which air is drawn in a first direction for cooling, a reverse airflow generation system to create a reverse airflow in a second direction opposite the first direction to clear debris from the intake screen, a sensor to sense debris that is collected on the intake screen and a controller to activate the reverse airflow generation system based upon signals from the sensor.

Disclosed herein is an example air intake system that comprises an air intake screen through which air is drawn, the air intake screen having a face, and a sensor comprising an emitter and a detector. The emitter is supported to emit a sensor beam along the face without intersecting the air intake screen prior to the sensor beam being sensed. The sensor is to output signals indicating accumulation of debris on the intake screen.

Disclosed herein is an example debris sensing and cleaning method that comprises sensing a degree of debris accumulation on an air intake screen and activating a reverse airflow generation system that directs a reverse airflow through the air intake screen based upon the sensed degree of debris accumulation on the air intake screen.

Figure 1:
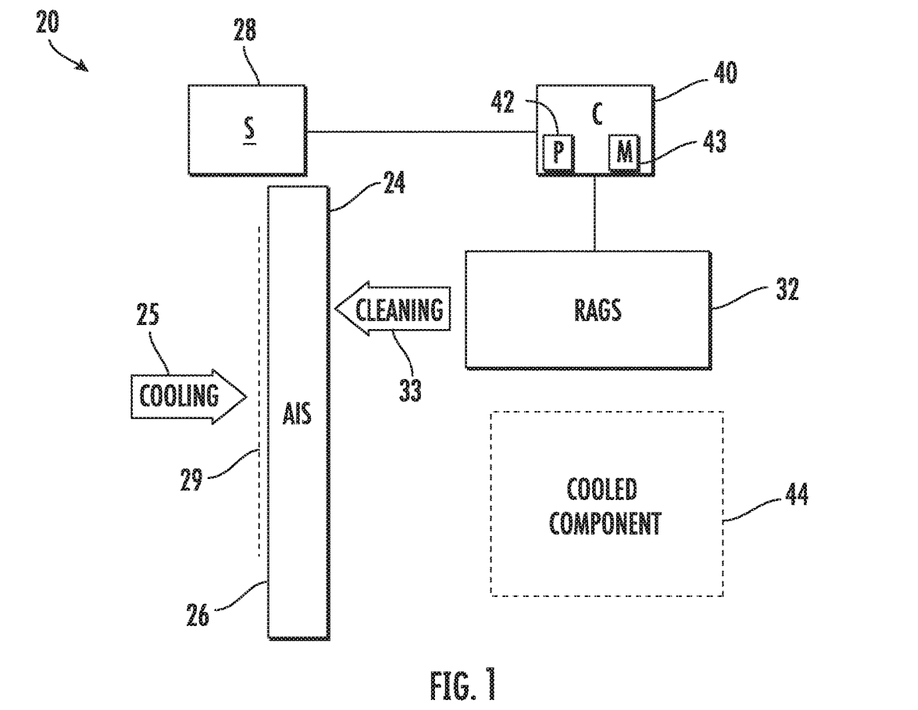
FIG. 1 is a schematic diagram illustrating portions of an example air intake screen monitoring and debris cleaning system.

FIG. 1 schematically illustrate portions of an example intake screen debris cleaning system 20. System 20 facilitates the sensing or detection of debris on an air intake screen which may further facilitate automatic and efficient cleaning of the air intake screen to enhance cooling of components of the working machine. As a result, the example systems and methods may prolong the useful life of the working machine component being cooled and may conserve energy. System 20 employs a sensor that senses debris that is collected on the intake screen, wherein a controller activates a reverse airflow generation system based upon signals from the sensor. The reverse airflow is directed in a second direction opposite to the direction which air is drawn through the screen for cooling. The reverse airflow cleans debris from the air intake screen. System 20 comprises air intake screen 24, sensor 28, reverse airflow generation system 32 and controller 40.

Air intake screen 24 comprises a screen or filter through which air is drawn (in the direction indicated by arrow 25) and subsequently directed towards a component 44 (schematically shown in broken lines) of the working machine that is to be cooled by the air. Screen 24 comprises an air intake face 26, the general outer surface of screen 24 that is first impinged by air being drawn through screen 24 prior to the air passing through screen 24. The air 25 may carry airborne debris which may be filtered and accumulate on air intake face 26. Screen 24 filters airborne debris from the airflow, reducing the accumulation of the debris on the equipment being cooled. In one implementation, the air intake screen may be a flat panel having perforations, lattice openings or other passages through which air flows. In one implementation, the air intake screen may comprise a series of channels along its air intake face 26. In another implementation of the air intake screen may be corrugated. At least one of the floor or interior sides of each of the channels or corrugated may have lattice openings or perforations through which air flows. In some implementations, air being drawn through air intake screen 24 is directly directed to the cooled component 44. In other implementations, the air drawn through the air intake screen is first passed through cooling cores or heat exchangers (shown and described hereafter) prior to being directed to the cooled component 44.

Sensor 28 senses the accumulation of debris (schematically shown and identified with reference number 29) on the air intake face 26. In one implementation, sensor 28 may detect the occlusion of individual openings extending through screen 24. In another implementation, sensor 28 may detect the accumulation and buildup of debris on air intake face 26 of screen 24. In one implementation, sensor 28 sensor utilizes an emitter and a detector, wherein the emitter emits a sensor beam that is directed along a face of the air intake screen without intersecting the air intake screen prior to being sensed. Debris accumulating on the face of their intake screen blocks or interrupts the sensor beam, facilitating the detection of debris accumulation. Because the sensor beam is directed across a face of the air intake screen, without intersecting the air intake screen, the sensor beam may detect debris accumulation across a larger surface area of the face of the air intake screen by sensing buildups of debris, rather than just occlusion of the individual vent openings or perforations.

In another implementation, sensor 28 utilizes an emitter and a detector, wherein the emitter emits the sensor beam that is directed along and within a channel that extends along a face of the air intake screen. Such an implementation, the sensor beam extends parallel to or at least along the channel without intersecting the floor sides of the channel, without intersecting the air intake screen itself, prior to being sensed. In one implementation, the sensor beam is directed to a spaced detector which is situated at a different location along the channel. In another implementation, the sensor beam is directed to a spaced reflector this is situated at a different location along the channel, were in the reflector reflects the sensor beam back towards a detector, such as a detector located alongside of the emitter or integrated with the emitter.

In some implementations, at least one of the emitter, detector and/or reflector (where provided) directly supported on and mounted to the air intake screen. In other implementations, the emitter, detector and/or reflector may each be supported in a frame or other support that supports the air intake screen or that surrounds the air intake screen, adjacent the front air intake side or face of the air intake screen. In yet other implementations, at least one of the emitter, detector and/or reflector (where provided) may be directly supported and mounted to or carried by the air intake screen while the others of the emitter/detector and/or reflector may be directly supported on in supported by a frame or other support that supports the air intake screen for that surrounds the air intake screen, adjacent the front air intake side face of the air intake screen.

In one implementation, the sensors in the form of emitter-detector (and the reflector in some cases) may be provided in every channel or groove of the air intake face of the air intake screen. In other implementations, the sensors may be distributed at selected locations in selected channels along the air intake face of the air intake screen. In some implementations, the sensors may be provided in just those portions of the air intake face that have historically experienced greater debris accumulation or that have a greater impact upon the cooling function.

In some implementations, sensor 28 may comprise a pressure sensor. For example, in one implementation, a pressure sensor may be provided to sense a pressure within a manifold or shroud adjacent a fan or blower, wherein pressure changes may indicate the accumulation of debris on the air intake screen. In such an implementation, the sensing of debris accumulation may trigger activation of a reverse airflow generation system.

Reverse airflow generation system (RAGS) 32 selectively generates a screen cleaning airflow 33 in response to signals from controller 40. Such airflow 33 extends in a direction through screen 24 and away from face 26, the airflow tending to detach and carry away debris 29 previously attached to face 26. RAGS 32 may be active during times in which cooling air 25 is not being created or drawn through screen 24. Conversely, RAGS 32 may be in active during periods of cooling, during periods of time during which air 25 is being drawn through screen 24.

In one implementation, RAGS 32 may comprise a variable pitch fan, wherein the picture angle of the fan blades are adjusted between a first cooling state in which air is drawn through the air intake side of the air intake screen and a second cleaning state in which air is blown through the air intake screen and away from the air intake screen. In other implementations, RAGS 32 may comprise other mechanisms for creating a reverse direction airflow through the air intake screen. For example, in other implementations RAGS 32 may comprise additional fans that direct airflow in the reverse direction (the direction opposite to the direction which air moves when performing the cooling function), were in such additional fans are in an inactive state during cooling. In yet other implementations, RAGS 32 may comprise movable or adjustable airflow directing baffles that selectively redirect airflow to change its direction.

Controller 40 comprises a processing unit 42 that follows debris sensing and cleaning instructions as stored in a non-transitory computer-readable medium or memory 43. Controller 40 receive signals from sensor 28 and controls the activation and inactivation of RAGS 32 based upon such signals which are in turn based upon the degree of debris accumulation on air intake face 26 of air intake screen 24.

In one implementation, the activation of RAGS 32 (and the corresponding inactivation of the fan or blower drawn cooling air 25 through screen 24) is based on the sensed degree of debris accumulation on the air intake screen 24 as indicated by signals from sensor 28. In another implementation, the activating of RAGS 32 (in the corresponding inactivation of the fan or blower drawn cooling air 25 through screen 24) is based upon the sensed degree of debris accumulation on the air intake screen 24 in combination with signal received by controller 40 indicating a sensed temperature of the cool component 44. For example, controller 40 may output control signals inactivating RAGS 32 or resulting in RAGS 32 remaining inactive during those times when the temperature of cool component 44 being cooled is above a predefined temperature threshold, such as when the operating machine is working in high ambient temperatures, despite a given degree of detected debris accumulation, whereas controller 40 may automatically activate RAGS 32 in response to the same given degree of detected debris accumulation when the temperature of component 44 is at a temperature less than the predefined temperature threshold.

Figure 2:
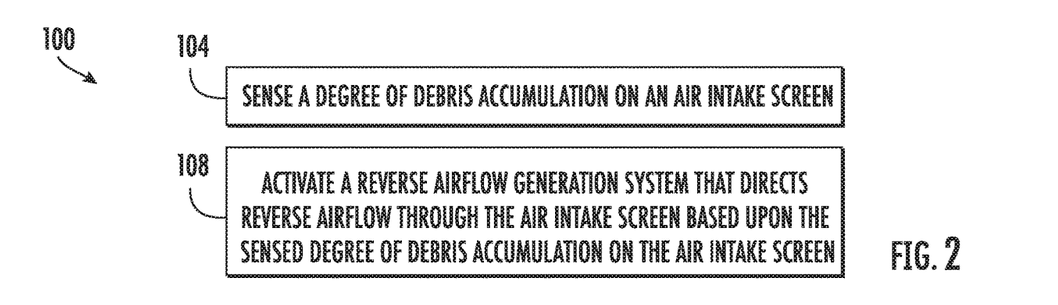
FIG. 2 is a flow diagram of an example air intake screen debris monitoring and cleaning method.

FIG. 2 is a flow diagram of an example intake screen debris monitoring and cleaning method 100. Method 100 facilitates the sensing or detection of debris on air intake screen which may further facilitate automatic and efficient cleaning of the air intake screen to enhance cooling of components of the working machine. As a result, method 100 may prolong the useful life of the working machine component being cooled and may conserve energy. Although method 100 is described in the constant being carried out by system 20 described above, it should be appreciated that method 100 may likewise be carried out with any of the following described intake screens, intake screen debris cleaning systems and air intake systems, as well as other similar systems.

As indicated by block 104, sensor 28 senses a degree of debris accumulation on an air intake screen. Such sensing may be continuous or may be periodic, at predefined time periods. In one implementation, such sensing may occur in response to the temperature of a component or the components being cooled by air drawn through the air intake screen 24 having a sensed temperature that reaches a predefined temperature (possibly indicating debris accumulation, or, alternatively, the components being cooled by air drawn through the air intake screen 24 having a sensed temperature that is below a predefined temperature, such that a sensed debris accumulation may be immediately addressed by reverse airflow generation. In some implementations, the sensing is triggered by the sensed temperature of the cooled component 44 exceeding a predefined minimum threshold followed by the same sensed temperature falling below the predefined temperature, wherein the prior high temperature may indicate the accumulation of debris and wherein the temperature subsequently falling below the predefined temperature may indicate that the ambient temperature has dropped or the operation of the working machine or cooled component 44 has slowed, providing a more opportune time to address the debris accumulation with a reverse air flow generation. In some implementations, such sensing may be manually initiated by an operator. Signals from the sensor 28, which may comprise multiple separate sensing elements, are transmitted to controller 40.

As indicated by block 108, controller 40, following instructions contained in medium 43, utilizes signals from sensor 28 to determine whether to activate RAGS 32. In one implementation, controller 40 utilizes such signals to determine whether the degree of debris accumulation on the air intake screen 24 satisfies a reverse airflow generation triggering criteria or criterium. One example criteria may comprise an average thickness or density of debris accumulation across a full face 26 of screen 24 above a predefined threshold, may comprise individual thicknesses or densities of debris accumulation at particular predefined regions or portions of face 26 above a predefined threshold, may comprise a percentage of the surface area or area of face 26 experiencing debris accumulation above a predefined percentage threshold, or may comprise satisfaction of a predefined percentage of the surface area of face 26 experiencing a debris accumulation having a density or thickness above a predefined density or thickness threshold. In some implementations, the triggering criteria may additionally include a frequency or duration component. For example, triggering of RAGS 32 may additionally require that any of the above described criteria occur above a predefined time frequency or exist for a predefined duration of time before activation of RAGS 32.

Upon the triggering criteria being satisfied, controller 40 activates RAGS 32. In one implementation, the duration during which RAGS 32 remains active (providing the reverse airflow) may vary under the control of controller 40 based upon the degree of debris accumulation on face 26 of air intake screen 24. For example, RAGS 32 may be active for a first amount of time given a first (a) average density or thickness of debris across a full face 26, (b) number of predefined portions or regions of face 26 satisfying a predefined debris density or thickness, (c) percentage of the area of face 26 having debris accumulation or a percentage of the area of face 26 having a debris density or thickness above a predefined threshold, whereas RAGS 32 may be active for a second greater amount of time given a second greater (a) average density or thickness of debris across a full face 26, (b) number of predefined portions or regions of face 26 satisfying a predefined debris density or thickness, (c) percentage of the area of face 26 having debris accumulation or a percentage of the area of face 26 having a debris density or thickness above a predefined threshold, respectively as discussed above, each of the individual criteria may additionally be based upon the frequency or duration of time. RAGS 32 may remain active for a first duration given satisfaction of one of the above criteria at a first frequency or a second duration, whereas RAGS 32 remain active for a second greater duration given satisfaction of one of the above criteria at a second greater frequency or a second greater duration. In some implementations, the amount of reverse airflow generated or the force of the reverse airflow generated may be varied by controller 40 based upon the above factors in addition to or as an alternative to the varying of the duration during which RAGS 32 is maintained in an active state.

In some implementations, the duration of time and/or amplitude/force of RAGS 32 being in the active state may be based upon closed-loop feedback utilizes signals from sensor 28. For example, RAGS 32 may be activated upon at least one of the above described triggering criteria being satisfied. Once activated, RAGS 32 may be maintained in the active state for a predefined initial duration. Following the initial duration, signals from sensor 28 may be once again analyzed by controller 40. RAGS 32 may once again be activated depending upon the secondary signals from sensor 28 and the sensed degree of debris accumulation. In one implementation, the criteria for reactivating RAGS 32 following the initial reverse airflow generation duration may be the same as those applied to initially activate RAGS 32. In other implementations, the criteria for reactivating RAGS 32 a second time, following the initial reverse airflow generation duration, may be different. More than two reverse airflow generation durations or RAGS activation periods may be carried out with each duration or period being followed by debris accumulation sensing by sensor 28.

In one implementation, controller 40 may repeatedly operate or activate RAGS 32 and a cleaning airflow generation system (that which produces cooling airflow 25) for a series of short forceful bursts. Such short bursts of airflow in opposite directions through screen 24 may facilitate the dis-lodgment of debris from screen 24. In one implementation, such short forceful bursts may occur at a frequency of no more than once every 90 seconds for duration of between 5 and 10 seconds each time. In one implementation, the burst of cooling airflow 25 may have a different duration as compared to each burst of the cleaning airflow 33. For example, in one implementation, each cooling airflow burst 25 may be of relatively long duration as compared to each cleaning airflow burst 33, such as where a relatively short cleaning burst may be sufficient to remove debris and where a relatively longer cooling burst may be needed to adequately cool the working machine. In some implementations, the duration of each burst or the frequency of the burst may change or be nonuniform during a cleaning cycle or operation. In some implementations, the duration of short bursts, the frequency of the short bursts or the duration of each individual burst may also be varied by controller 40 based upon the degree to which at least one of the above described debris accumulation criteria has been satisfied.

In some implementations, controller 40 may output control signal to RAGS 32 varying the direction of cleaning airflow 33. In particular, controller 40 may output control signals to RAGS 30 to slightly varying the direction of cleaning airflow 33. Although cleaning airflow 33 remains generally opposite to that of cooling airflow 25, the angle relative to face 26 may be slightly varied. In some implementations, controller 40 may adjust the direction of cleaning airflow 33 to better facilitate dislodgment of debris from face 26. In one implementation, the selected angle of cleaning airflow 33 by RAGS 32 may be controlled by controller 40 based upon signals from sensor 28. For example, the angle of cleaning airflow 33 may be varied based upon the degree to which any of the above described criteria for debris accumulation has been satisfied. In some implementations, once RAGS 32 has been activated, controller 40 may adjust the angle of cleaning airflow 33 relative to face 26 during the active period of time. In those implementations where controller 48 controls RAGS 32 to carry out multiple active reverse airflow generation periods, each of the different reverse airflow generation periods may be associated with a different angle of cleaning airflow 33. In some implementations, RAGS 32 may be alternated (switch back and forth) between different states providing different angles of cleaning airflow to facilitate enhanced dislodgment of debris. In some implementations, controller 40 may carry out a predetermined cleaning protocol in which RAGS 32 provides cleaning airflow according to a predefined pattern or series of different angles. Different protocols may be stored in memory, wherein the different protocols may be associated with particular crop types, crop varieties and/or crop conditions (current yield, moisture and the like). User inputted crop conditions or real-time sensed crop conditions may be used by controller 40 to select a particular protocol. In some implementations, controller 40 may switch between the use of different protocols based upon historical data stored in memory or in maps and the current physical location of the harvester in the field as provided by geo-referencing sources, such as global positioning system data. In one implementation, the particular angle of cleaning airflow provided by RAGS 32 may vary based upon closed-loop feedback information regarding debris accumulation from sensor 28.

Figure 3:
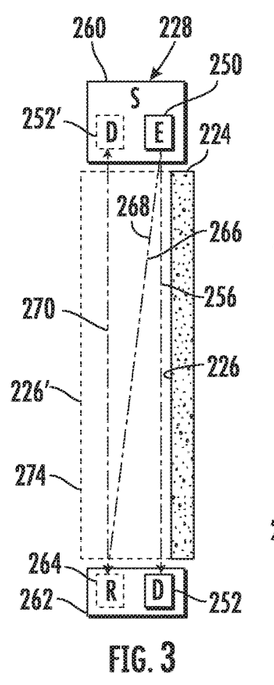
FIG. 3 is a sectional view of portions of an example air intake screen and sensor taken along line 3-3 of FIG. 4A.

FIG. 3 is a sectional view (with portions schematically shown) illustrating an example air intake screen 224 and an example sensor 228. Intake screen 224 and sensor 228 may be utilized as part of system 20 in place of screen 24 and sensor 28, respectively. Screen 224 comprises a generally flat panel or set of panels having two-dimensional array of openings therethrough, in the form of perforations or lattice openings. Screen 224 comprises an air intake face 226 which correspond to face 26 of screen 24.

Sensor 228 comprises an optical sensor that senses emitted electromagnetic radiation, such as light or infrared light, wherein the electromagnetic radiation sensed is impacted by the accumulation of debris on face 226. Sensor 228 comprises emitter 250 and detector 252. Emitter 250 admits electromagnetic radiation, in the form of a sensor beam 256 which travels along face 226, without intersecting face 226, until being sensor detected by detector 252. In one implementation, sensor beam 256 extends generally parallel to face 226. In one implementation, emitter 250 and detector 252 are provided by separate spaced apart components 260, 262, wherein components 260, 262 are separated by at least portions of face 226 therebetween.

As indicated by broken lines, in other implementations, sensor 228 may comprise detector 252' in place of detector 252 and may additionally comprise a reflector 264. In such an implementation, emitter 250 may be configured so as to emit a sensor beam 266 having a first portion 268 that is directed to reflector 264 and a second portion 270 that is reflected by reflector 264 back to the detector 252'. In such an implementation, detector 252' may be provided by the same component 260 that houses, supports or provides emitter 250, wherein the reflector 264 is housed, supported are provided by the second spaced apart component 262, components 260 and 262 being spaced by at least portions of the intervening face 226.

Figure 4A:
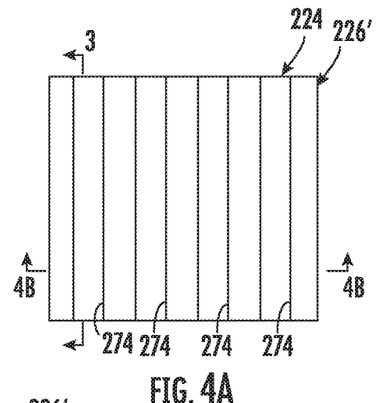
FIG. 4A is a plan view of an air intake face of an example air intake screen.
Figure 4B:
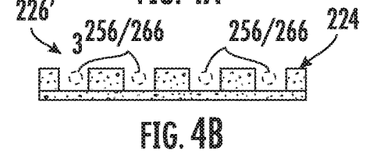
FIG. 4B is a sectional view of one example air intake screen of FIG. 4A taken along line 4B-4B of FIG. 4A.

As shown in broken lines in FIG. 3 and as further illustrated in the FIGS. 4A and 4B, in one implementation, air intake screen 224 may comprise grooves, valleys or channels 274 along one side, forming air intake face 226' of screen 224. As shown by FIG. 4B, one implementations, channels 224 may comprise grooves formed in a layer of material. In one up limitation, the openings passing through screen 224 may extend through just the floors of such channels. In other implementations, the openings may pass through both the floors and the intermediate portions between channels 224. As shown by FIGS. 3 and 4B, emitter 250, detectors 252 and 252' and reflector 264 (where provided) are each configured, supported or arranged such that sensor beams 256 and 266 in the different implementations are each contained within their respective channels 274 without intersecting screen 224 prior to being detected by detector 252, 252'. As a result, sensor 228 detects accumulation within channels 274, which may or may not be necessarily occluding the air transmission openings through the walls of screen 224.

Figure 5:
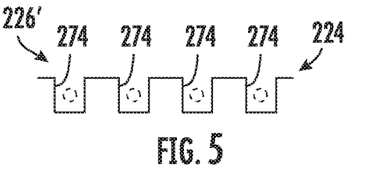
FIG. 5 is a sectional view of another example air intake screen taken along line 4B-4B of FIG. 4A.

FIG. 5 is a sectional view illustrating screen 324, an alternative implementation of screen 224. Screen 224 is similar to screen 224 except that screen 324 comprises a panel or multiple panels that are corrugated (such as in a square wave, a sine wave or a pointed series of oppositely directed teeth) to form channels 274 along face 226'. Those remaining components of screen 324 which correspond to components of screen 224 are numbered similarly. As should be appreciated, the screen 224, screen 324 and sensor 228 (shown in FIG. 3) may be utilized as part of the above described system 20 in place of screen 24 and sensor 28, respectively. As shown by FIG. 5, sensor 228 is supported such that sensor beams 256, 266 travel or pass within channels 274, either parallel to face 226' or oblique to face 226', without intersecting screen 224 (without intersecting the floor sides of channels 274) prior to being sensed or detected by detector 252, 252'. In one implementation, the floors and tops of the panel forming screen 324 may be perforated to form openings. In another implementation, the entire panel or panels forming screen 324 may be formed by a latticework having lattice openings through which air flows.

Although FIGS. 4B and 5 illustrate a sufficient number of sensors 228 provided so as to emit and detect a sensor beam 256, 266 that travels within each of channels 274, in other implementations, a fewer number of sensors 220 may provide such that some of channels 274 do not contain a sensor beam. For example, in one implementation, sensor 220 may be provided such that every other channel 274 contains a sensor beam 256/266. In some implementations, other distribution of sensors 28 and their respective sensor beams 256/266 may be utilized. In some implementations, each individual sensor beam 256/26 may travel along a majority, if not substantially the entire length of its respective channels 274. In one implementation, each channel 274 is provided with a single sensor, wherein emitter 250 and the spaced apart detector 252 (or reflector 264) are positioned at opposite ends of the channel. In other implementations, each channel 274 may be provided with multiple sensors 228, multiple emitter-detector pairs spaced apart and sensing multiple segments of an individual channel 274.

Figure 6:
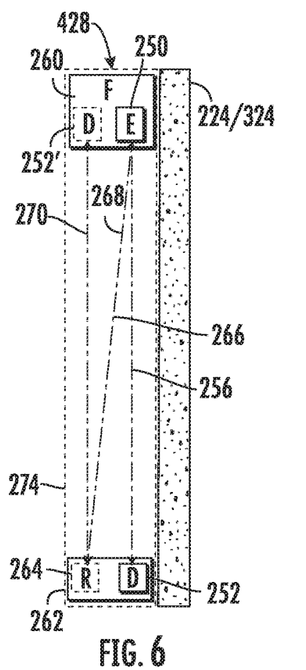
FIG. 6 is a sectional view of portions of an example air intake screen and sensor taken along line 3-3 of FIG. 4A.

FIG. 6 is a sectional view illustrating portions of screen 224/324 and sensor 428. Sensor 428 is similar to sensor 228 described above except that both of components 260, 262 of sensor 428 are directly supported by and sass or directly mounted to screen 224/324. As a result, screen 224/324 and sensor 428 may be provided as a single self-contained unit that may replace and repaired. In one implementation, components 260, 262 are welded or fastened to screen 2247324. With respect to screen 324, which includes channels 274, components 260, 262 are secured or affixed to screen 324 within the individual channels 274.

Figure 7:
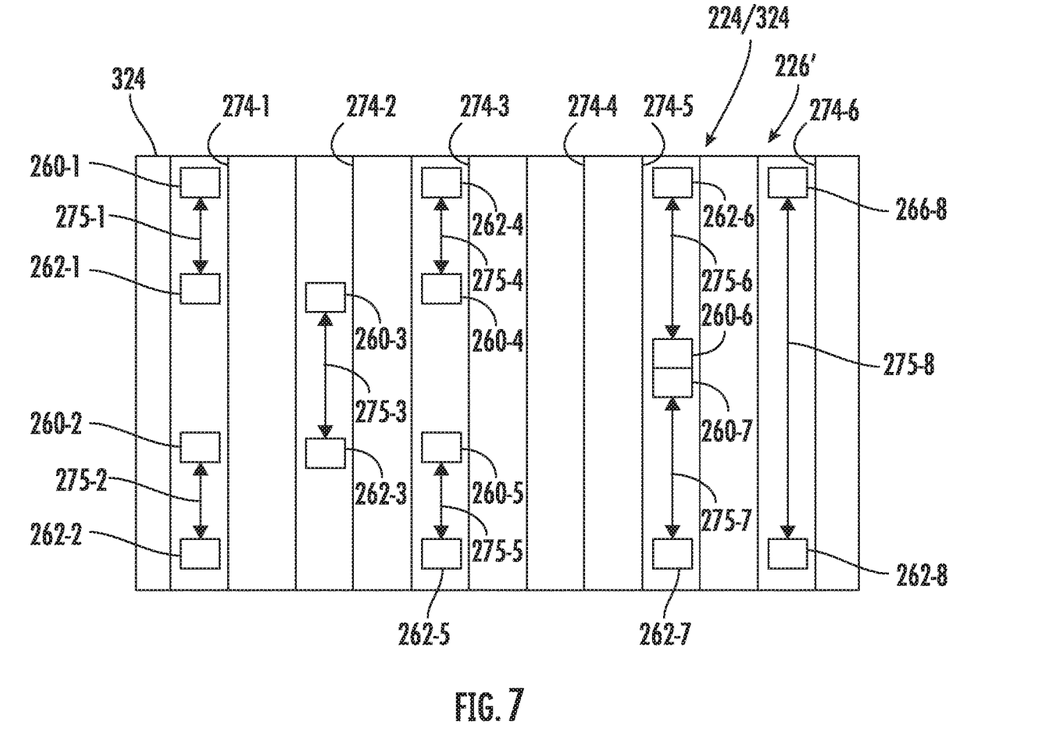
FIG. 7 is a plan view of portions of an air intake face of an example air intake screen illustrating example arrangements of sensors on the air intake face of the screen.

Although FIG. 6 illustrates components 260 and 262 of sensor 428 being supported at substantially opposite ends within an individual one of channels 274, in other implementations, each channel 274 may be provided with multiple sensors 428, multiple pairs of components 260, 262 spaced apart and sensing multiple segments or zones of an individual channel 274. For example, FIG. 7 illustrates a larger portion of screen 324 having channels 274-1, 274-2, 27 4-3, 274-4, 274-5 and 274-6 (collectively referred to as channels 274). FIG. 7 further illustrates various example layouts or arrangements of sensor components 260-1, 260-2, 260-3, 260-4, 260-5, 260-6, 260-7, 260-8 (collectively referred to as components 260) and their corresponding associated sensor components 262-1, 262-2, 262-3, 262-4, 262-5, 262-6, 262-7 and 262-8 (collectively referred to as components 262), respectively. Paired sensor components 260-1 and 262-1 cooperate with one another to sense debris accumulation in a sensing zone between components 260-1 and 262-1 on face 226'. Likewise, paired sensor components 260-2 and 262-2 cooperate with one another to sense debris accumulation in an associated sensing zone between sensor components 260-2 and 262-2. The remaining components pairs of 260, 262 cooperate to similarly detect debris accumulation between the paired components. As discussed above, in one implementation, each of components 260 comprises an emitter 250 while the paired component 262 comprises a detector. In yet other implementations, each of components 260 comprises both emitter 250 and detector 252' while the paired component 262 comprises the reflector 264.

In the example illustrated in FIG. 7, channel 274-1 contains two sensors or component pairs, a first pair comprising components 260-1 and 262-1 having a sensing zone 275-1 and a second component pair comprising components 260-2 and 262-2 having a sensing zone 275-2. The next consecutive channel 274-2 has a single component pair comprising components 260-3 and 262-3 having a sensing zone 275-3. Sensing zone 275-3 is staggered with respect to sensing zones 275-1 and 275-2 such that the three zones, collectively, cover the full length of screen 224/324. At the same time, the reduced length of each individual sensing zone provides a greater sensing resolution. As further shown by FIG. 7, channel 274-3 is similar to channel 274-1 in that channel 274-3 comprises two component pairs, components 262-4, 260-4 having sensing zone 275-4 and components 260-5, 262-5 having sensing zone 275-5. Zones 275-4 and 275-5 are spaced apart from one another within channel 274-3 and are staggered with respect to sensing zone 275-3.

As shown by channel 274-4, some of channels of screen 224/324 may omit sensors or component pairs. As shown by channel 274-5, in some implementations, a channel may be provided with multiple sensors or component pairs, wherein the component pairs within the single channel provide zones that collectively cover the entire length of the individual channel. In some implementations, like components may be arranged adjacent to one another within a channel. For example, as shown by FIG. 7, components 260-6 and 260-7 are positioned adjacent to one another while their corresponding components 262-6 and 262-7 are positioned at opposite ends of channel 274-5. Components 260-6 and 262-6 provide sensing zone 275-6 while components 260-7 and 262-7 provide sensing zone 275-7. Such an arrangement may facilitate more efficient connection or wiring. For example, in implementations where components 262-6 and 262-7 comprise reflectors 264, both of the components 260-6 and 260-7 containing both an emitter 250 and a detector 252' may be situated adjacent one another to utilize a single wire connection point or two adjacent wire connection points. In some implementations, components 260-6 and 260-7 may be combined as part of a single two-sided component having two oppositely directed emitters and two oppositely directed detectors. As shown by channel 274-6, in some implementations, a channel may be provided with a single component 260-8 and a single component 262-8 which have a sensing zone that spans substantially the entire length of the channel.

FIG. 7 illustrates various layouts of sensors in the form of paired components 260, 262. Other implementations may utilize any combination of the various channel paired component arrangements. Moreover, each channel may include any number of paired components in any of the above disclosed patterns or arrangements. The overall screen 224/324 itself may include different patterns or arrangements of paired components/sensors in different regions of the screen. For example, those regions of screen 224/324 found to be more likely to experience higher degrees of debris accumulation may be provided with a greater density of paired components for higher resolution debris accumulation sensing as compared to other regions less likely to experience high degrees of debris accumulation.

Figure 8:
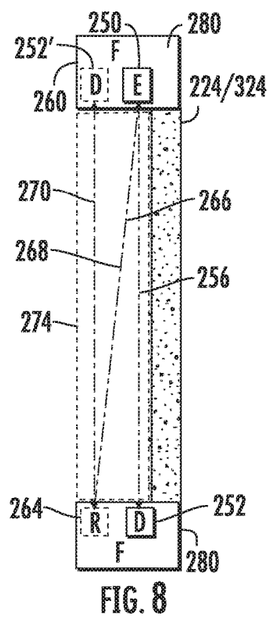
FIG. 8 is a sectional view of portions of an example air intake screen and sensor taken along line 3-3 of FIG. 4A.

FIG. 8 is a sectional view illustrating portions of an example screen 224/324 specifically illustrating each of components 260, 262 being supported distinct from screen 224/324. In the example illustrated, each of components 260, 262 is supported in an outer frame structure (F) 280 which surrounds at least two opposite sides of screen 224/324. In one implementation, frame structure 280 may support screen 224/324. In other implementations, frame structure 280 may simply extend up to an independently supported screen 224/324. The provision of sensor component 260, 262 independent of screen 224/324 facilitates replacement of screen 224/324 without the replacement of components 260, 262.

Figure 9:
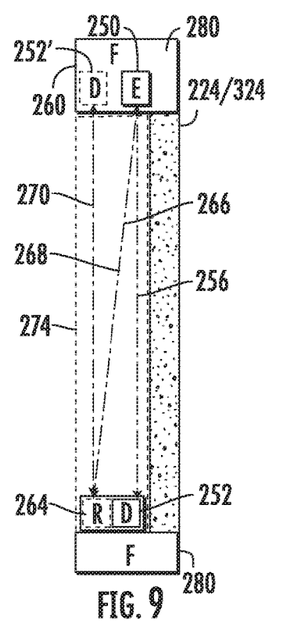
FIG. 9 is a sectional view of portions of an example air intake screen and sensor taken along line 3-3 of FIG. 4A.

FIG. 9 is a sectional view illustrating portions of an example screen 224/324 specifically illustrating component 260 being supported by frame structure 280 while component 262 is directly mounted to and directly supported by screen 224/324. In implementations where component 260 comprises both emitter 250 and detector 252' while component 262 merely comprises reflector 264, such a construction maintains all the wired or powered connections within frame structure 280 while the non-electronic physical reflector 264 is mounted or provided as part of screen 224/324. Such a construction facilitates lower cost construction of screen 224/324 while at the same time allowing the reflector 264 to be directly mounted to the screen for enhanced alignment consistency.

Figure 10:
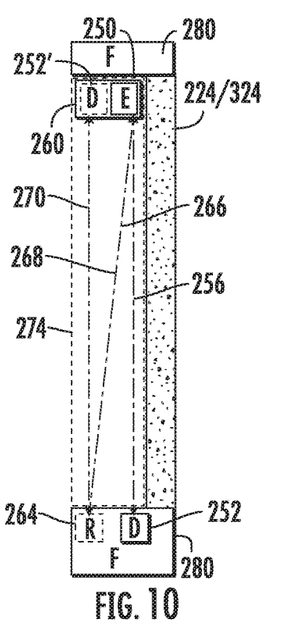
FIG. 10 is a sectional view of portions of an example air intake screen and sensor taken along line 3-3 of FIG. 4A.

FIG. 10 is a sectional view illustrating portions of an example screen 224/324 specifically illustrating component 262 being supported by frame structure 280 while component 260 is directly mounted to and directly supported by screen 224/324. In implementations where component 260 comprise both emitter 250 and detector 252', such a construction facilitates direct mounting of both emitter and the detector to screen 224/324 for enhanced alignment reliability. In implementations where component 260 comprises emitter 250 while component 262 comprise detector 252, and is part of frame structure 280, and is part of frame structure 280, such a construction facilitates enhanced alignment reliability between emitter 250 and screen 224/324. Such enhanced alignment reliability refers to consistent positioning of the emitter and/or detector relative to and within the particular channel 274 to ensure that the sensor beam being emitted is accurately aligned with the beam receiving window of the detector.

Figure 11:
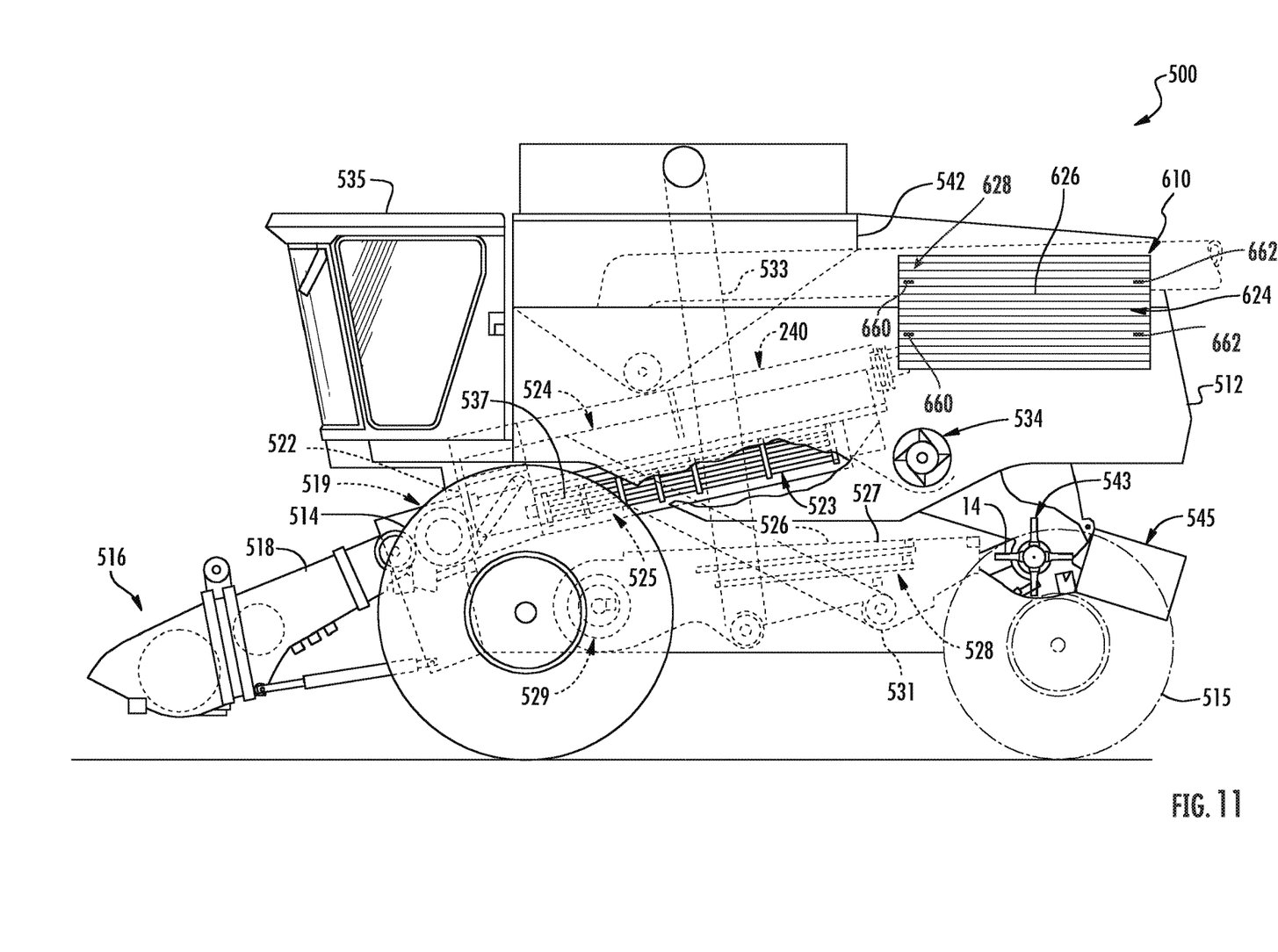
FIG. 11 is a side view illustrating portions of an example working vehicle in the form of an example combine harvester having an example cooling system.

FIG. 11 illustrates an example working vehicle in the form of an example combine harvester 500. Harvester 500 facilitates the harvesting of crops. In one implementation, combine harvester 500 may be equipped with a row unit head the harvesting row unit crops, such as corn. In other implementations, combine harvester 500 may be equipped with a head for harvesting other crops which are gathered by a reel and conveyed to a feeder house by augers or conveyor belts. In other implementations, combine harvester 500 may comprise a cotton harvester. Combine harvester 500 incorporates a power unit in the form of an internal combustion engine 608 (shown in FIG. 13A and a cooling system 610 (shown in FIGS. 13A and 13B) to cool circulating fluids passing through system 610.

In addition to engine 608 and cooling system 610, combine harvester 500 comprises a main frame 512 having wheel structure including front and rear ground engaging wheels 514 and 515 supporting the main frame for forward movement over a field of crop to be harvested. The front wheels 514 are driven by an electronically controlled hydrostatic transmission.

A vertically adjustable header or harvesting platform 516 is used for harvesting a crop and directing it to a feeder house 518. The feeder house 518 is pivotally connected to the frame 512 and includes a conveyor for conveying the harvested crop to a beater 519. The beater 519 directs the crop upwardly through an inlet transition section 522 to a rotary cleaning and separating assembly 524. In other implementations, other orientations and types of cleaning structures and other types of headers 516, such as transverse frame supporting individual row units, are utilized.

The rotary cleaning and separating assembly 524 threshes and separates the harvested crop material. Grain and crop residue, such as chaff, fall through a concave 525 and separation grates 523 on the bottom of the assembly 524 to a cleaning system 526, and are cleaned by a chaffer 527, sieve 528 and air fan or blower 529. The blower 529 blows the lighter crop residue above the chaffer 527 and above the sieve 528 rearwardly to the crop residue spreader 545. The grain passes through openings, between louvers, provided by the chaffer 527 and the sieve 528. The clean grain is directed to elevator 533. Clean grain elevator 533 conveys the grain to tank 542. The clean grain in the tank 542 can be unloaded into a grain cart or truck by unloading auger.

Tailings fall into the return elevator or auger 531 and are conveyed to the rotor 537 where they are threshed a second time.

Threshed and separated straw is discharged to a discharge beater 534. In one implementation, the discharge beater 534, in turn, propels the straw to the rotary chopper 543 for being discharged from the rear of combine harvester 500 by spreader 545. The operation of the combine is controlled from an operator's cab 535.

Figure 13A:
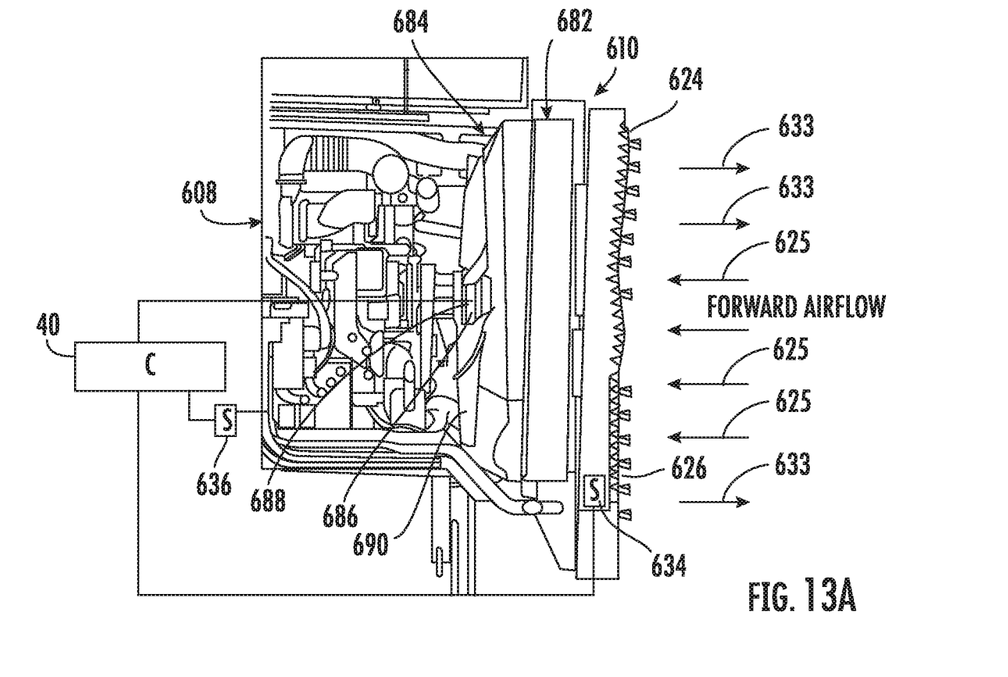
FIG. 13A is a side view illustrating portions of an example cooled component in the form of an example engine and the cooling system.

As shown by FIGS. 11 and 13A, engine 608 and cooling system 610 are located at a rear of harvester 500. In the example illustrated cooling system 610 draws ambient air from a transverse side of harvester 600 proximate the rear of harvester 500. In other implementations, system 610 may draw ambient air, for passage through at least one cooling core, from a side, top, bottom or front of harvester 500, avoiding locations where air-borne debris may be more prevalent.

Cooling system 610 incorporates an air intake screen debris monitoring and cleaning system such as system 20 in the form of air intake screen 624 (shown in FIGS. 11, 12A, 12B, 12C and 12D and FIG. 13A), debris accumulation sensors 628, temperature sensor 630 (shown in FIG. 13A) reverse airflow generation system 632 (shown in FIGS. 13A and 13B) and controller 40. Air intake screen 624 is similar to air intake screen 324 described above. In the example illustrated, air intake screen 624 comprises a panel or a stacked group of panels which are corrugated to form a series of parallel channels 674 extending along substantially an entire length of screen 624. The sidewalls, floor and top of each of the channel 674 are provided with openings, such as perforations or lattice openings through which air may flow. In other implementations, screen 624 may be similar to screen 224 described above. In particular implementations, each of the convolutions of screen 624 may have a square, curved or pointed cross-sectional shape. In some implementations, screen 224 may be a flat panel, omitting convolutions or channels.

Figure 12A:
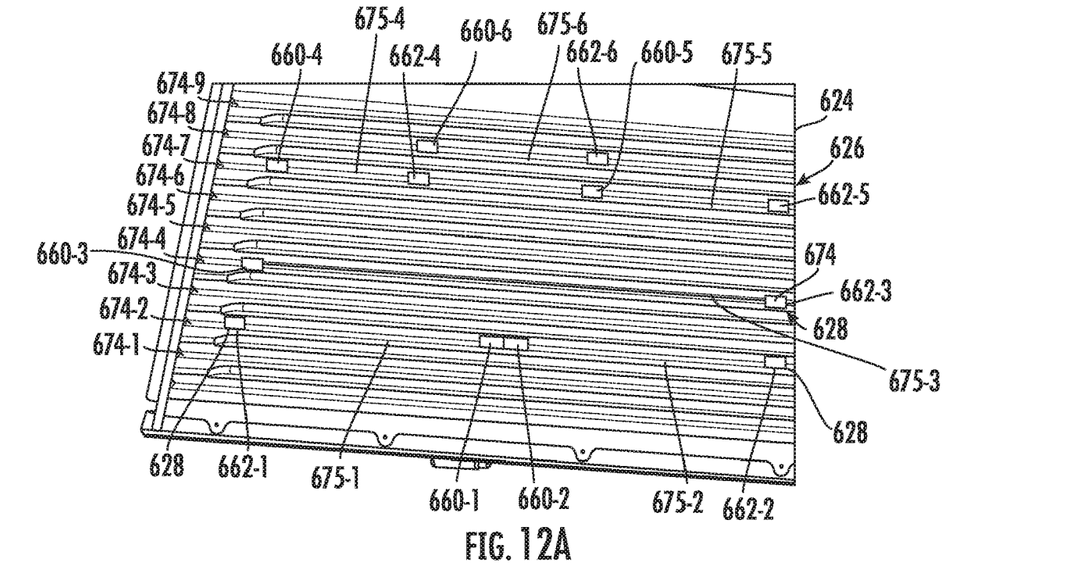
FIG. 12A is a front plan view of portions of an air intake face of an example air intake screen and associated debris accumulation sensors.

FIG. 12A illustrates one example layout of examples sensors 628 across the air intake face 626 of screen 624. FIG. 12A illustrates channels 674-1, 674-2, 674-3, 674-4, 674-5, 674-6, 674-7, 674-8 and 674-9 (collectively referred to as channel 674. Channel 674-1674-3, 674-5, 674-6 and 674-9 are devoid of sensors 628. Channel 674-2 has a layout of sensors similar to the layout described above with respect to channel 274-5 of FIG. 7, wherein channel 674-2 is provided with two back-to-back sensors 628 which, together, provide sensing zones along substantially the entire length of channel 674-2. Components 660-1 and 662-1 form a first sensor 628 forming a first sensing zone 675-1 therebetween while components 660-2 and 662-2 form a second sensor 628 and a second sensing zone 675-2 therebetween.

Channel 674-4 comprises a single sensor 628 formed by a sensor component 660-3 at one end of channel 674-4 and a paired component 662-3 at a second opposite end of channel 674-4 so as to form a sensing zone 675-3 therebetween that spans substantially the entire length of channel 674-4.

Channel 674-7 and 674-8 have an arrangement of sensors 628 which are similar to the arrangement described above with respect to channels 674-1 and 674-2 in FIG. 7. Channel 674-7 contains two sensors or component pairs, a first pair comprising components 660-4 and 662-4 having a sensing zone 675-4 therebetween and a second component pair comprising components 660-5 and 662-5 having a sensing zone 675-5 therebetween. Channel 674-8 has a single component pair comprising components 660-6 and 662-6 having a sensing zone 675-6 therebetween. Sensing zone 675-6 is staggered with respect to sensing zones 675-4 and 675-5 such that the three zones, collectively, cover the full length of screen 624. At the same time, the reduced length of each individual sensing zone provides a greater sensing resolution. Although such staggered zones of the two different channels are illustrated as having aligned ends, in some implementations, the sensing zones of the staggered sensors 628 in the different channels may overlap one another.

Figure 12B:
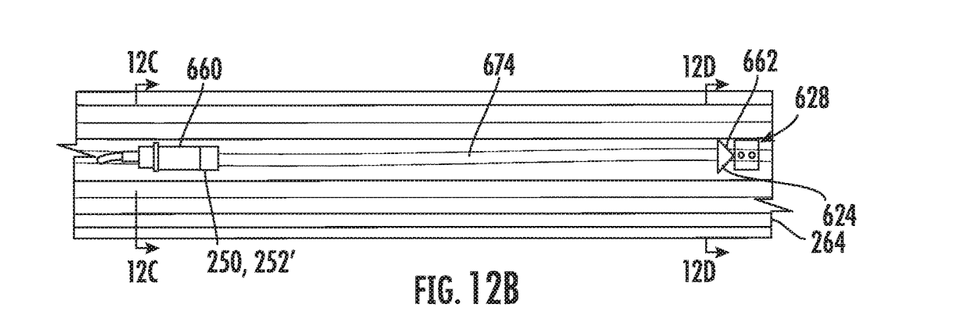
FIG. 12B is an enlarged top view of an example sensor of FIG. 12A.
Figure 12C:
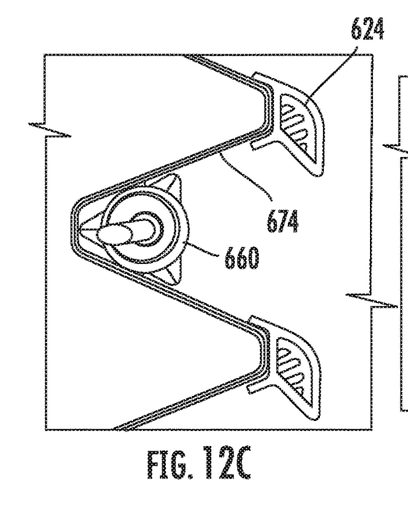
FIG. 12C is a sectional view of the sensor of FIG. 12B taken along line 12C-12C of FIG. 12.
Figure 12D:
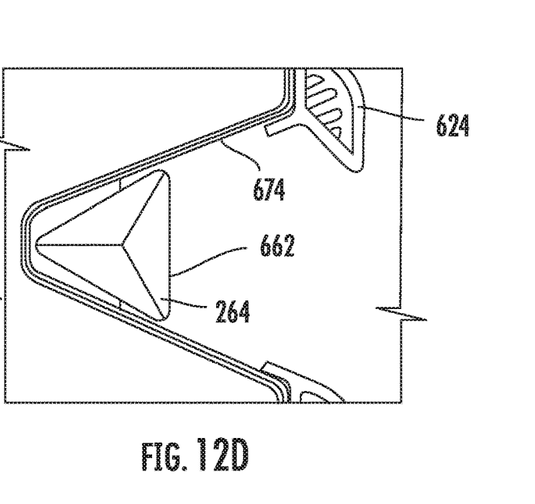
FIG. 12D is a sectional view of the sensor of FIG. 12B taken along line 12D-12D of FIG. 12B.

FIGS. 12B, 12C and 12D illustrate one example sensor 628 shown in FIG. 12A. As shown by FIG. 12B, sensor 628 comprises sensor component 660 and 662. As shown by FIG. 12C, component 660 is received within its respective channel 674, wherein component 660 comprises both an emitter 250 and a detector 252' (shown and described above with respect to FIG. 3). As shown by FIG. 12D, component 662 comprises a reflector 264 as described above. During operation, the emitter 250 emits a sensor beam the travels along and within channel 674 without intersecting the floor or sides of the channel prior to being reflected by reflector 264. The sensor beam is reflected by reflector 264 back along channel 674, without intersecting the floor or sides of the channel prior to being detected by detector 252'. The region between component 660 and 662 form the sensing zone. Any debris accumulated within the sensing zone may block or partially block the transmission or travel of the sensor beam. The detected blockage results in signals being output by the sensor 228 that may indicate to controller 40 the accumulation of debris within the sensing zone.

Figure 13B:
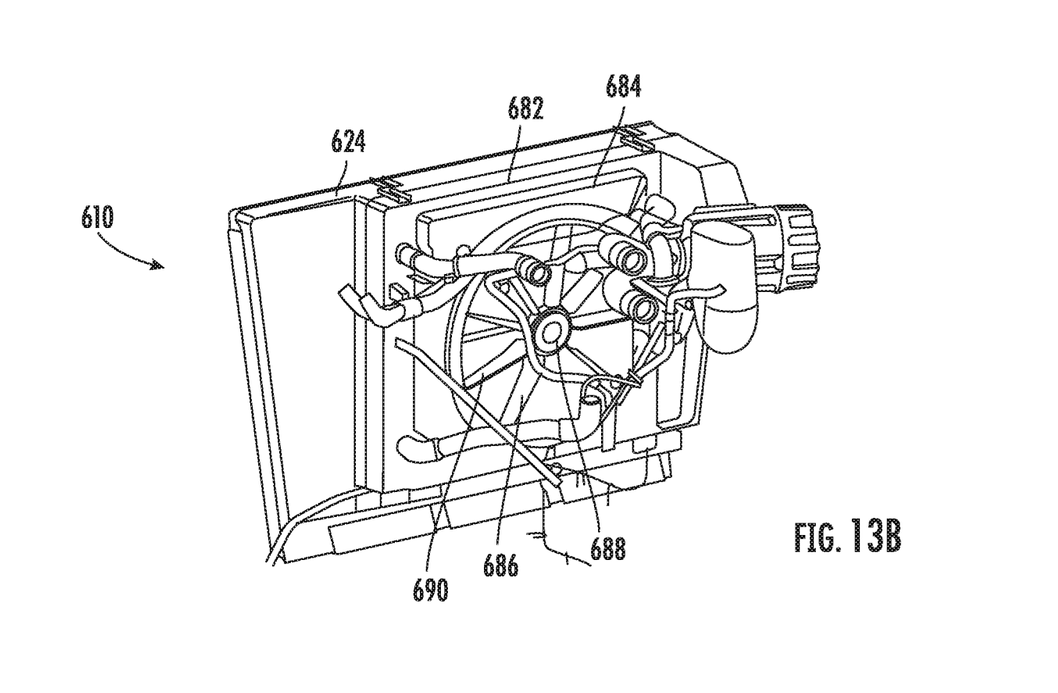
FIG. 13B is a rear perspective view of the example cooling system of FIG. 13A.

FIGS. 13A and 13B provide a larger view of the overall cooling system 610. In the example illustrated, cooling system 610 comprises air intake screen 624 along with sensors 628 (shown in FIGS. 12A, 12B, 12C and 12D)), temperature sensors 634, 636, controller 40 (schematically shown and described above), cooling cores 682, fan shroud 684 and fan 686. Cooling cores 682 comprise a series of heat exchangers or conduits through which liquid coolant flows. The liquid coolant facilitates a cooling of working components other than engine 608 that are remote from cooling system 610. In one implementation, cooling core 682 are part of a condenser heat exchanger for air conditioning, such as air conditioning of 535. In one implementation, cooling cores 682 direct fluid through a series of internal fins having a large surface area by which heat may be conducted to the air passing by such fins.

Shroud 684 comprises a fan enclosure that extends across a rear face of core 682 at least partially about fan 686. Fan shroud 652 directs the airflow through core 682 and through screen 624.

Fan 686 comprises a series of blades to be rotatably driven to create airflow. In the example illustrated, fan 686 comprises blades having an adjustable or reversible pitch, such that fan 686 may be actuated between a cooling state in which fan 686 creates airflow in the direction indicated by arrows 625 shown in FIG. 13A and a cleaning state in which fan 686 creates a reverse airflow as indicated by arrows 633. Thus, fan 686 serves as both a forward airflow generation system for cooling and a reverse airflow generation system for air intake screen cleaning.

Temperature sensors 634 comprises a sensor to detect the temperature of ambient air, air either outside cooling system 610 and/or air being drawn through screen 624. Signals indicating the sensed ambient air temperature are transmitted to controller 40. Temperature sensors 636 comprise sensors that sense the temperature of the working of components that are to be cooled by cooling system 610. For example, temperature sensors 636 may detect the temperature of engine 608, the detected temperature of the cabin to be cooled by air conditioning or other components of the harvester 500. Signals from temperature sensors 636 indicating such temperatures are transmitted to controller 40.

Figure 14A:
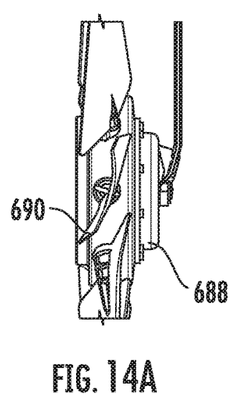
FIGS. 14A, 14B, 14C AND 14D are sectional views illustrating actuation of an example reverse airflow generation system from a cooling state to a cleaning state.
Figure 14B:
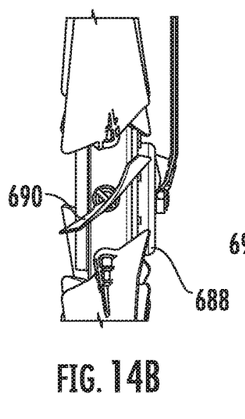
Figure 14C:
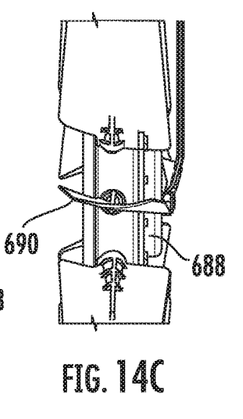
Figure 14D:
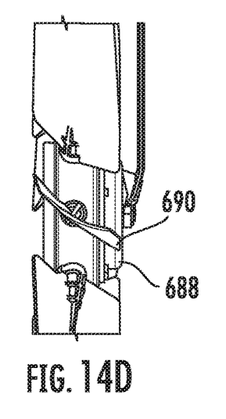

FIGS. 14A, 14B, 14C and 14D illustrate actuation of fan 686 between the cooling state shown in FIG. 14A and the reverse airflow, cleaning state shown in FIG. 14D. As shown by FIGS. 14B and 14C, the blades may be actuated to intermediate cooling states and cleaning states. With the example variable pitch fan 686, hydraulic pressure within the hub 688 of fan 686 is adjusted to selectively control or adjust the pitch of the fan blades 690. Examples of such variable pitch fans of those commercially available from Flexxaire having offices at Edmonton, Alberta, Canada or Cleanfix having offices at Stratford, Ontario, Canada. In other implementations, other variable pitch fans may be employed.

Controller 40 is described above with respect to system 20. Controller 40 comprises a processing unit 42 that follows instructions contained in a non-transitory computer-readable medium 43 (shown in FIG. 1). Controller 40 may carry out any of the above described cooling and cleaning processes. For example, controller 40 carry out method 100 described above. In one implementation, controller 40 output control signals to a hydraulic pump and series of control valves to control the hydraulic pressure being supplied to hub 688 to control the pitch of blades 690 based upon the sensed degree of debris accumulation on air intake screen 624. As with the control of RAGS 32, the control of RAGS 632 by controller 40 may be based on multiple parameters or factors and may be carried out in multiple different fashions or modes of operation.

Figure 15:
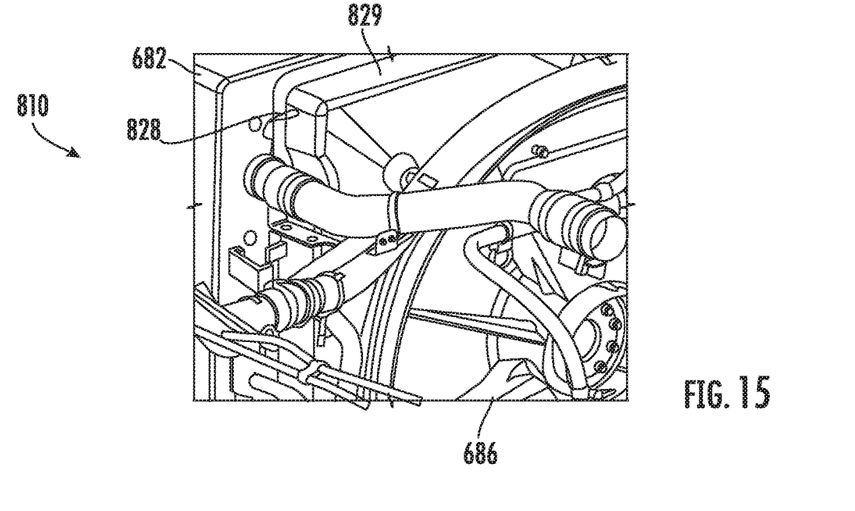
FIG. 15 is a rear perspective view of portions of an example cleaning system for the harvester of FIG. 11.

FIG. 15 is a rear perspective view of portions of an example cooling system 810. Cooling system 810 may be utilized in place of cooling system 610 in harvester 500. Cooling system 810 is similar to cooling system 610 in all respects except that in lieu of sensors 628, cooling system 810 comprises pressure sensor 828. Pressure sensor 828 is mounted to cooling system 810 to detect changes in internal air pressure. In the example illustrated, pressure sensor 828 is mounted to a manifold 829 between cooling core 682 and fan 686. Debris accumulation on air intake face 626 of screen 624 (shown in FIG. 13A) may result in a vacuum being created within manifold 829 during cooling. This vacuum or drop in pressure may be detected by pressure sensor 828. Pressure sensory 828 outputs signals to controller 40 which utilize such signals to determine a degree to which air intake face 626 has accumulated debris. Based upon the determined degree of accumulated debris across face 626, controller 40 controls RAGS 632. In the example illustrated, controller 40 outputs control signals adjusting the direction of the airflow created by fan 686 as described above.

Although the present disclosure has been described with reference to example implementations, workers skilled in the art will recognize that changes may be made in form and detail without departing from the spirit and scope of the claimed subject matter. For example, although different example implementations may have been described as including features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. An air intake screen debris monitoring and cleaning system comprising:
    an intake screen through which air is drawn in a first direction for cooling, wherein the intake screen comprises a series of parallel channels forming an outermost air intake face of the intake screen;
    a reverse airflow generation system to create a reverse airflow in a second direction opposite the first direction to clear debris from the intake screen;
    a sensor to sense debris that is collected on the intake screen; and
    a controller to activate the reverse airflow generation system based upon signals from the sensor,
    wherein the intake screen extends in a first plane and wherein the sensor comprises an emitter and a detector to detect electromagnetic radiation in a second plane parallel to the first plane, wherein the emitter is to emit a sensor beam within and along one of the channels without intersecting the outermost air intake face of the intake screen and wherein the detector is to detect the sensor beam.

2. The system of claim 1, wherein the reverse airflow generation system comprises a fan supported to direct air in the second direction and wherein the emitter is to direct the sensor beam along the air intake screen in a third direction perpendicular to the second direction.

3. The system of claim 1, wherein the sensor comprises a first sensing component providing the emitter and a second sensing component spaced from the first sensing element along the intake screen within the second plane, the second sensing component comprising the detector.

4. The system of claim 1, wherein the sensor comprises a first sensing component comprising the emitter and the detector and a second sensing component spaced from the first sensing component along the intake screen within the second plane, the second sensing component comprising a reflector supported to direct electromagnetic radiation emitted by the emitter back towards the detector.

5. The system of claim 1, wherein the sensor comprises:
    a reflector directly mounted upon the intake screen.

6. The system of claim 1, wherein the sensor comprises a pressure sensor to sense a pressure change resulting from debris accumulation on the intake screen.

7. An air intake system comprising:
    an air intake screen through which air is drawn, the air intake screen having an outermost air intake face;
    a sensor comprising an emitter and a detector, the emitter being supported to emit a sensor beam along the outermost air intake face without intersecting the outermost air intake face of the air intake screen prior to the sensor beam being sensed, the sensor to output signals indicating accumulation of debris on the intake screen, wherein the sensor is directly and fixedly mounted upon the outermost air intake face and carried by the intake screen.

8. The air intake system of claim 7, wherein the air intake screen comprises a series of parallel channels forming the outermost air intake face of the air intake screen, wherein the emitter is supported to emit the sensor beam within and along one of the channels.

9. The air intake system of claim 8, wherein the sensor comprises:
    a first sensor component comprising the emitter; and
    a second sensor component spaced from the first sensor component, the second sensor component comprising one of the detector and a reflector, wherein at least one of the first sensor component and the second sensor component is directly mounted to the intake screen within and on a surface of said one of the channels.

10. The air intake system of claim 7 further comprising a fan having a reversible pitch to selectively direct airflow in opposite directions along an axis through the air intake screen and wherein the sensor beam extends perpendicular to the axis.

11. The air intake system of claim 10 further comprising a controller to activate the fan based upon signals from the sensor.

12. The system of claim 7, wherein the intake screen comprises a plurality of elongate channels, wherein the sensor comprises a first emitter and detector pair within a first one of the plurality of elongate channels and wherein the system further comprises:
    a second sensor comprising a second emitter and detector pair within a second one of the plurality of elongate channels.

13. The system of claim 7, wherein the sensor has a first sensing zone across a first portion of the outermost air intake face of the intake screen and wherein the system further comprises:
    a second sensor having a second sensing zone across a second portion of the outermost air intake face of the intake screen.

14. The system of claim 7 further comprising:
    a reverse airflow generation system to create a reverse airflow in a second direction opposite the first direction to clear debris from the intake screen; and
    a controller to activate the reverse airflow generation system based upon signals from the sensor.

15. An air intake screen debris monitoring and cleaning system comprising:
    an intake screen through which air is drawn in a first direction for cooling;
    a reverse airflow generation system to create a reverse airflow in a second direction opposite the first direction to clear debris from the intake screen;
    a sensor to sense debris that is collected on the intake screen, wherein the sensor has a first sensing zone across a first portion of an air intake face of the intake screen;
    a second sensor having a second sensing zone across a second portion of the air intake face of the intake screen; and
    a controller to activate the reverse airflow generation system based upon signals from the sensor, wherein the intake screen extends in a first plane and wherein the sensor comprises an emitter and a detector to detect electromagnetic radiation in a second plane parallel to the first plane.

16. The system of claim 15, wherein the intake screen comprises an elongate channel and wherein the first sensor and the second sensor are located within the elongate channel.

17. The system of claim 16, wherein the first sensor comprises a first emitter-detector pair and wherein the second sensor comprises a second emitter-detector pair.

18. The system of claim 15 further comprising a third sensor having a third sensing zone across a third portion of the air intake face of the intake screen, the third sensing zone being staggered with respect to the first sensing zone and the second sensing zone.

19. The system of claim 15, wherein the first sensing zone extends from the sensor in a third direction along the air intake face of the air intake screen and wherein the second sensing zone extends from the second sensor in a fourth direction opposite the third direction along the air intake face of the air intake screen.

20. The system of claim 19, wherein the sensor and the second sensor are arranged back-to-back between opposite ends of the intake screen.

\* \* \* \* \*